Dec. 24, 1968   C. D. McCONNELL   3,417,882
SHAKER LOADER
Filed June 16, 1966   2 Sheets-Sheet 1
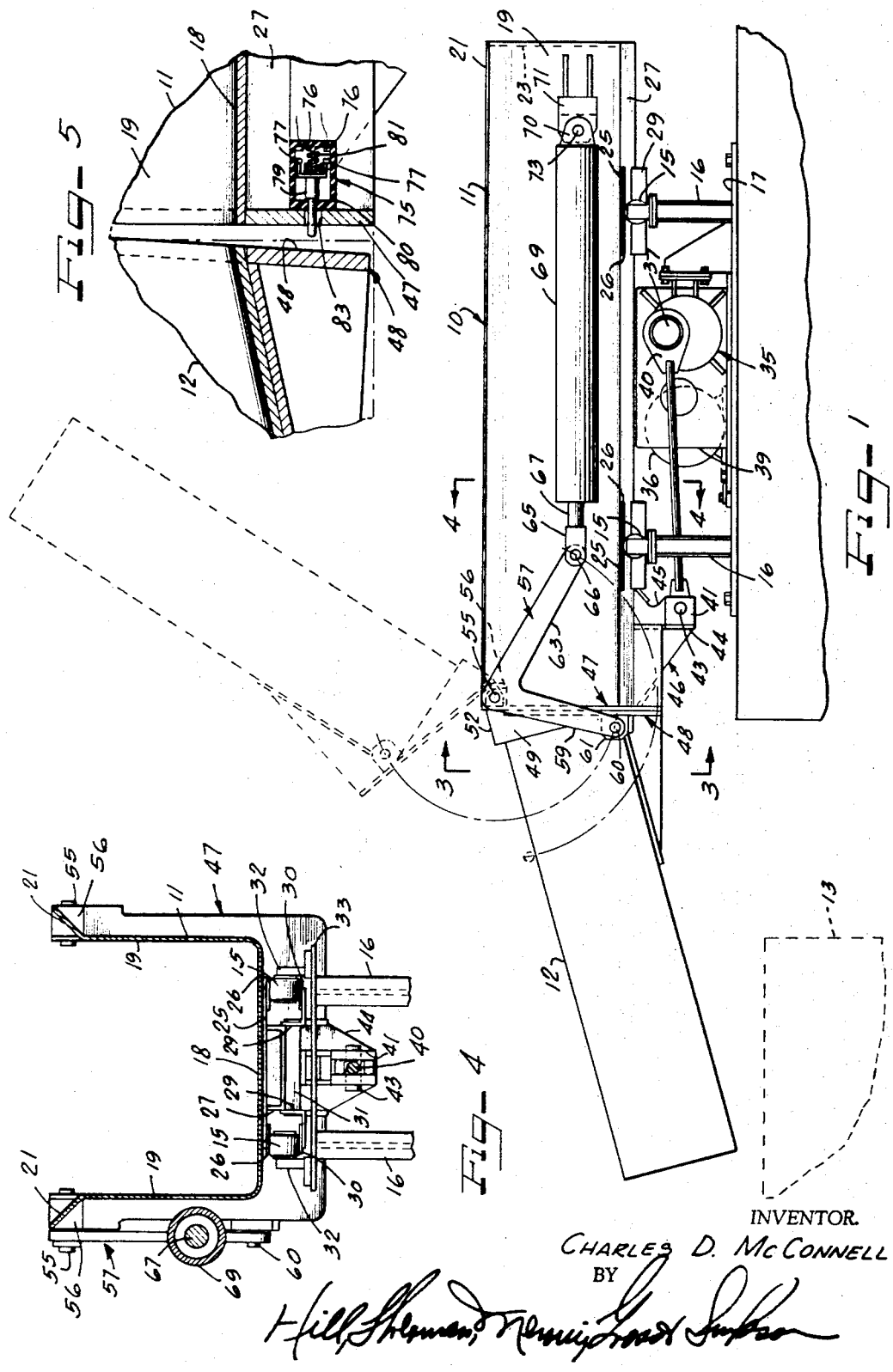
INVENTOR.
CHARLES D. McCONNELL
BY Dec. 24, 1968   C. D. McCONNELL   3,417,882
SHAKER LOADER
Filed June 16, 1966   2 Sheets-Sheet 2
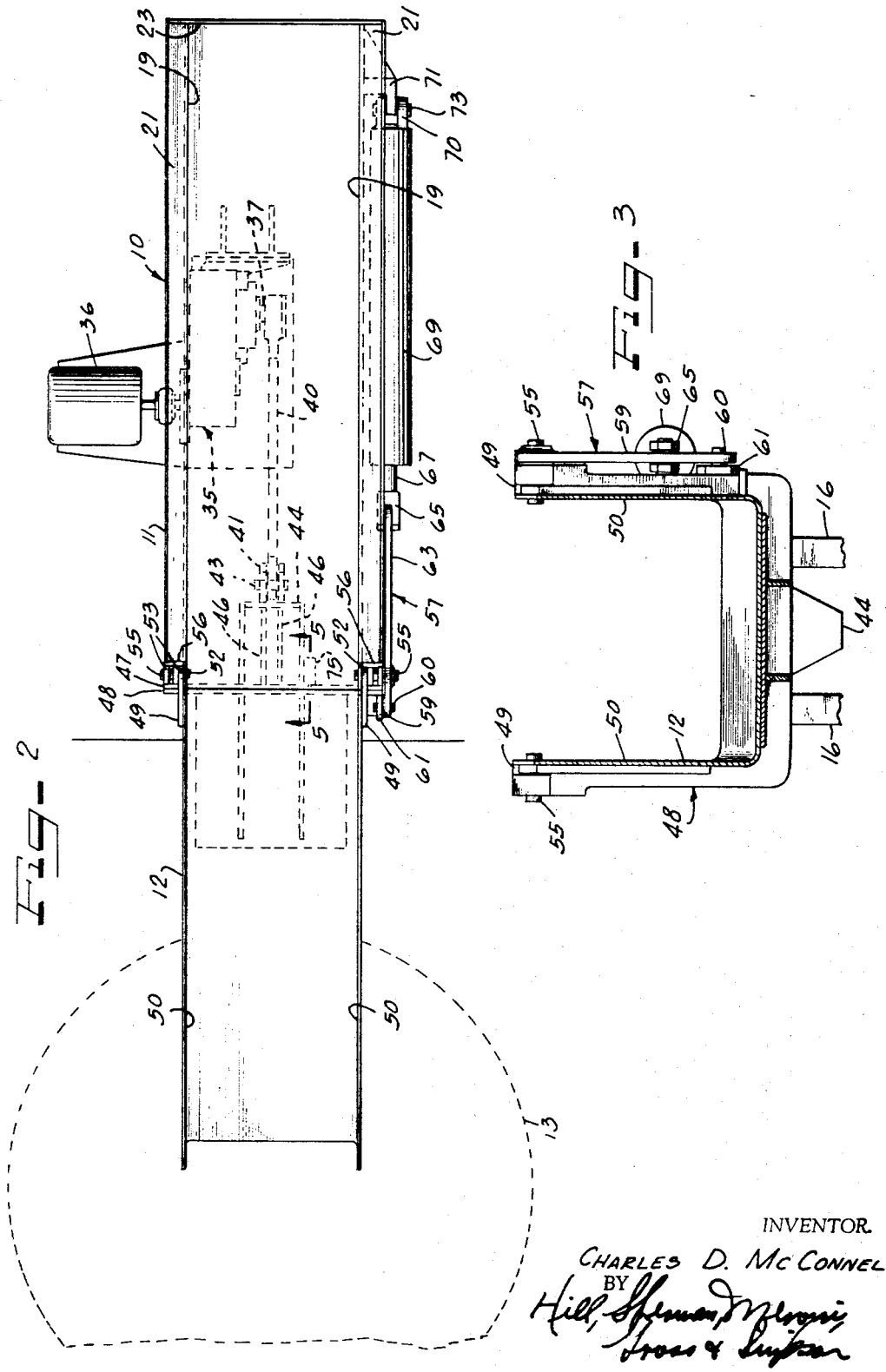
INVENTOR.
CHARLES D. McCONNELL
BY United States Patent Office 3,417,882
Patented Dec. 24, 1968

3,417,882
SHAKER LOADER
Charles D. McConnell, Hinsdale, Ill., assignor to Westinghouse Air Brake Company, Pittsburgh, Pa., a corporation of Pennsylvania
Filed June 16, 1966, Ser. No. 557,931
9 Claims. (Cl. 214—18)

ABSTRACT OF THE DISCLOSURE

Shaker conveyor furnace charger in which a loading trough is mounted on a stationary base for reciprocable movement and is reciprocably driven with a shaker conveyor motion by a shaker conveyor drive mechanism on the base. A delivery trough is pivoted to the discharge end of the loading trough and is reciprocably driven thereby. A fluid pressure operated hydraulic jack is connected between the loading trough and the delivery trough to pivot the delivery trough upward to an out-of-the-way position when the furnace has been charged. Cooperating the stop plates on the loading trough and delivery trough are provided to limit downward movement of the delivery trough to a delivery position. A switch is connected in the energizing circuit to the shaker conveyor drive mechanism and is actuated by the delivery trough when in its delivery position to prevent the operation of the shaker conveyor drive mechanism except when the delivery trough is in a delivery position.

Objects of the invention

A principal object of the present invention is to provide an improved form of shaker conveyor loader, adapted for charging furnaces and other devices in which the charger is arranged with a view toward utmost efficiency and simplicity in construction and operation.

Another object of the invention is to provide a simple and improved shaker conveyor loader particularly adapted for charging furnaces and other devices, and having a retractable delivery end, retracted in a simple manner to provide clearance for dumping the furnace and a clear passageway about the furnace when not in operation.

A still further object of the invention is to provide a shaker conveyor loader having a delivery trough hinged to a loading trough and capable of being raised into a retracted position to provide floor clearance, in which a simplified hinge and stop arrangement of loading and delivery troughs is provided, locating the delivery trough in an extended delivery position.

Still another object of the invention is to provide a simplified form of loading unit in which a shaker conveyor drive mechanism forms a part of the unit for driving aligned loading and delivery troughs with a conveying action, in which the delivery trough is hinged to the loading trough for retraction to provide a passageway in front of the loading trough when not in operation, and in which the shaker conveyor drive mechanism is only operative when the delivery trough is in its extended delivery position.

These and other objects of the invention will appear from time to time as the following specification proceeds and with reference to the accompanying drawings wherein:

FIGURE 1 is a view in side elevation of a shaker conveyor loader constructed in accordance with the principles of the present invention, showing the delivery trough in an extended delivery position;

FIGURE 2 is a plan view of the shaker conveyor loader shown in FIGURE 1;

FIGURE 3 is a fragmentary transverse sectional view taken substantially along line 3—3 of FIGURE 1;

FIGURE 4 is a fragmentary transverse sectional view taken substantially along line 4—4 of FIGURE 1; and FIGURE 5 is a partial fragmentary longitudinal sectional view taken substantially along line 5—5 of FIGURE 2, and showing the means for locating the delivery trough in a delivery position and for initiating operation of the shaker conveyor drive mechanism.

In the embodiment of the invention illustrated in the drawings, I have shown in FIGURES 1 and 2 a shaker conveyor loader 10, which may be a furnace charger. The shaker conveyor loader 10 includes a shaker conveyor loading trough 11 having a delivery trough 12 forming a forward continuation thereof and shown as extending over a furnace 13, diagrammatically indicated by broken lines in FIGURES 1 and 2. The charger 10 is supported on spaced rollers 15, 15 mounted on the tops of parallel spaced posts 16, 16 extending upwardly of a base plate 17 and welded or otherwise secured to said base plate.

The trough 11 is shown in FIGURES 1, 2 and 4 as having a relatively flat bottom 18 and parallel upright side walls 19, 19 flared outwardly at their upper ends, as indicated by reference characters 21, 21. A closure plate 23 extends across the receiving end portion of the trough 11, to prevent the spillage of material beyond the rear end of said trough as material is loaded thereonto. The trough 11 is provided with longitudinally spaced plates 25 welded or otherwise secured to its bottom and having parallel spaced bearing strips 26, 26 extending therealong and forming wear strips for the rollers 15, 15, supporting said trough for reciprocable movement. The trough 11 also has an intermediate reinforcing channel 27 extending for the length thereof and welded or otherwise secured to said trough at the bottoms of the legs of said channel. The legs of the channel also form supports for retainer angles 29, welded thereto on the vertical legs thereof. The horizontal legs of the angles 29 extend outwardly beneath the rollers 15 and have wear strips 30 extending therealong beneath the rollers 15, and retaining the trough to said rollers. The angles 29 are reinforced and retained in position by transverse vertically extending spacer plates 31 extending across the bottom of the channel 27 between the vertical legs of the angles 29 and welded or otherwise secured to said channel and vertical legs. The rollers 15, supporting the trough 11 on the tops of the posts 16, are journalled on brackets 32 in a conventional manner, which in turn are mounted on plates 33 extending across the top of the posts 16.

A conventional shaker conveyor drive mechanism 35, driven from an electric motor 36, is mounted on the top of the base plate 17 for reciprocably driving the troughs 11 and 12 with a relatively long stroke shaker conveying action, to advance the loose material loaded onto the trough 11 along said trough and discharge the material beyond the delivery end of the delivery trough 12. The shaker conveyor drive mechanism may be of a conventional form so need not herein be described in detail, except to point out that it includes a crank 37 rotatably driven from the motor 36 at a variable angular velocity through gearing (not shown) contained in a housing 39 for the shaker conveyor drive mechanism. The crank 37 has a connecting rod 40 journalled thereon and extending forwardly therefrom and connected at its free end to a connector 41 on a pivot pin 43. The connector 41 is shown in FIGURES 1 and 4 as supported beneath the bottom of the trough 11 and as being of a bifurcated formation, the furcations of which extend along opposite sides of the connecting rod 40. The connector 41 is backed up by an abutment plate 44 extending across and depending from the bottom of the channel 27 and welded or otherwise secured thereto. The abutment plate 44 is reinforced by depending vertical reinforcements 45, extending from the bottom of the reinforcement channel 27 to the connector 41 and welded or otherwise secured thereto. The abutment plate 44 is also reinforced by gusset plates 46, extending vertically along the front face thereof and angularly upwardly of the bottom of the connector 41 to the front end portion of the trough 11. The gusset plates 46 terminate at the rear end portion of a U-shaped stop collar or flange 47, extending about the receiving end of the trough 11 and laterally and downwardly therefrom. The stop collar or flange 47 forms an abutment stop for a corresponding U-shaped collar or flange 48 extending laterally of the delivery trough 12 and welded or otherwise secured thereto, at the required angle to hold said delivery trough in a delivery position.

The delivery trough 12 is shown as being of a generally U-shaped form conforming to the cross section of the trough 11 and as having the stop collar 48 extending laterally outwardly of its receiving end, to be engaged by the stop collar 47, when the trough 12 is in its delivery position.

The delivery trough 12 has arms 49, 49 extending along opposite sides 50, 50 thereof and having right angled portions 52 extending inwardly from the top thereof along the outsides of the top portions of the side walls 19, 19. The right angled portions 52 extend along the insides of the connector ears 53 and are pivotally connected to said connector ears and the side walls 19, 19, on pivot pins 55, 55. FIGURE 2 shows the flared portions 21 of the side walls 19 terminating rearwardly of the right angled portions 52 of the arms 49. The flared portions 21 are abutted at their forward ends by transverse plates 56, welded or otherwise secured to the front ends of the outwardly flared portions 21 and the side walls 19 and forming a support means for the ears 53, 53, extending forwardly therefrom, in parallel relation with respect to each other.

The means for raising and lowering the delivery trough 12 about the axis of the pivot pins 55 is shown in FIGURES 1, 2 and 3 as being a bell crank 57, pivoted intermediate its ends on the outer end portion of a pivot pin 55. The bell crank 57 has a depending arm 59 extending angularly downwardly to the lower end portion of the trough 12, and pivotally connected thereto on the pivot pin 60, mounted on and extending outwardly of a bracket 61 spaced laterally of the side wall 50 of said trough and welded or otherwise secured thereto. A lever arm 63 of the bell crank 57 extends angularly rearwardly and downwardly of the pin 55 between the furcations of a bifurcated connector 65 and pivotally connected thereto on a pivot pin 66. The connector 65 is shown in FIGURES 1 and 2 as extending from the end of a piston rod 67 extending from a piston (not shown) in a fluid pressure cylinder 69. The fluid pressure cylinder 69 has a pair of spaced connector ears 70 extending from its head end along opposite sides of a connector bracket 71, welded or otherwise secured to the outside of the side wall 19 of the trough 11 and extending outwardly therefrom. A pivot pin 73 is provided to pivotally connect the connector ears 70 to the bracket 71.

The fluid pressure cylinder 69 may be a double acting cylinder, to effect extensible movement of the piston rod 67 and raising of the delivery trough 12 when fluid under pressure is admitted to the head end of said cylinder, and to effect lowering of said delivery trough from the dotted line position shown in FIGURE 1 to its inclined delivery position, by the admission of fluid under pressure to the piston rod end thereof, in a conventional manner.

A switch 75 (FIGURE 5) has spaced contacts 76 connected in the energizing circuit to the motor 36, and engaged by movable contacts 77 to close a circuit to said motor. The contacts 77 are suitably carried on the inner end of a plunger 79 slidably guided in a casing 80 for the switch. A spring 81 is provided to bias the contacts 77 out of engagement with the contacts 76 except when the delivery trough 12 is in its extended delivery position. The switch casing 80 is shown as abutting the bottom of the web of the channel 27 and the back wall of the stop collar 47 and positioning the plunger 79 to pass through an opening 83 in said stop collar 47. The plunger 79 may thus be engaged by the rear face of the stop collar 48, and retracted within the switch casing 80, to complete a circuit between the contacts 76 and 77 as the delivery trough 12 is lowered into its delivery position.

The delivery trough 12 is inclined downwardly of the discharge end of the trough 11, not only to promote the discharge flow of the loose material but also to locate the delivery end of said trough close to the top of the furnace, to discharge ore into the furnace, close enough to the molten metal in the furnace to avoid splashing, and the possibility of burning out the lining of the furnace, which may be caused by splashing of the molten metal. It should be understood, however, that said trough need not be inclined downwardly but may extend horizontally, and that the angle of said trough may be varied in accordance with the consistency of the material flowing along said trough.

It may be seen from the foregoing that I have provided a simple shaker loader, particularly adapted for charging furnaces in which the delivery end of the loader may readily be retracted to provide clearance between the loader and furnace or other device charged, and that with the simple arrangement shown, the necessity of removing the entire conveyor to a safe distance from the device loaded is obviated, and the drive to the device is so interlocked with the delivery trough as to prevent driving of the apparatus except when the delivery trough is in its extending delivery position.

While I have herein shown and described one form in which the invention may be embodied, it may readily be understood that various variations and modifications in the invention may be attained without departing from the spirit and scope of the novel concepts thereof.

I claim as my invention:

1. In a shaker loader for charging furnaces and the like,
    an elongated loading trough supported and guided for reciprocable movement and having a discharge end,
    means for reciprocably driving said loading trough with a shaker conveying motion,
    a delivery trough pivoted to the discharge end of said loading trough and reciprocably driven thereby,
    power means acting between said loading and delivery troughs effective to pivotably move said delivery trough upward to an out-of-the-way position,
    and means limiting downward movement of said delivery trough into a delivery position in substantial alignment with said loading trough.

2. A shaker loader for charging furnaces in accordance with claim 1,
    wherein the power means acting between the loading and delivery troughs for pivotally moving the delivery trough upward to an out-of-the-way position comprises,
    lever means pivotally movable about the axis of pivotal movement of said delivery trough with respect to said loading trough and operatively connected to one of said troughs, and
    a fluid pressure operated cylinder and piston acting between said lever means and the other of said troughs.

3. A shaker loader for charging furnaces in accordance with claim 1,
    wherein the delivery trough is transversely pivoted to opposite side of the loading trough adjacent the upper discharge end of said trough,
    wherein the power means acting between said loading trough and said delivery trough comprises,
        a fluid pressure operated cylinder and piston pivotally mounted on said loading trough, and lever means operated thereby and pivotally movable about the axis of pivotal movement of said delivery trough and operatively connected with said delivery trough.

4. The structure of claim 1,
wherein the power means acting between the loading and delivery troughs to pivotally move the delivery trough upward to an out-of-the-way position comprises
   a fluid pressure operated cylinder and piston connected between said loading and delivery troughs and
   wherein the means limiting downward movement of the delivery trough into a delivery position in substantial alignment with the loading trough comprises
   a vertical stop plate at the discharge end of said loading trough and
   a second stop plate at the receiving end of said delivery trough and engaging said first mentioned stop plate at the extreme limits of downward movement of said delivery trough, and
   wherein means mounted on one of said stop plates and operated by the other of said stop plates is provided to prevent reciprocable movement of said loading trough except when said delivery trough is in a delivery position in substantial alignment with said loading trough.

5. A shaker loader for charging furnaces in accordance with claim 3,
   wherein a switch is mounted on said loading trough at the discharge end thereof,
   wherein said switch is normally open and prevents operation of said means driving said trough with a shaker conveying action.
   and wherein said switch has a plunger extending toward said delivery trough and engaged thereby when said delivery trough is in a lowered charging position and closing the contacts of said switch to effect operation of said means reciprocably driving said loading trough.

6. In a shaker loader for charging furnaces and the like,
   a loading trough,
   a base,
   means supporting and guiding said trough on said base for reciprocable movement in a generally horizontal plane.
   shaker conveyor drive mechanism mounted on said base including a crank,
      a connecting rod connecting said crank to said loading trough,
      and an electric motor for driving said crank to reciprocably drive said connecting rod to drive said loading trough with a shaker conveying action,
   a delivery trough forming a retractable continuation of said loading trough,
   means pivotally mounting said delivery trough on said loading trough at the upper forward end portion of said loading trough and spaced along opposite sides thereof,
   power means raising and lowering said delivery trough with respect to said loading trough about the axis of said pivotal mounting means,
   a vertical stop plate extending about the discharge end of said loading trough laterally beyond the sides and bottom thereof,
   and a second stop plate extending about the receiving end of said delivery trough and engaging said first stop plate upon lowering movement of said delivery trough into a lowermost charging position.

7. The structure of claim 6,
wherein means are provided preventing operation of said electric motor and shaker conveyor drive mechanism except when said delivery trough is in its lowermost delivery position, which comprises:
   a switch having normally open contacts connected in the energizing circuit to said electric motor,
   a plunger having a contact on the inner end thereof engaging said normally open contacts and completing an energizing circuit to said motor,
   said plunger extending into position to be engaged by said second flange upon downward movement of said delivery trough, to move said contact into a position to close the circuit between said normally open contacts and effect energization of said motor and a drive to said troughs when said delivery trough is in an extended delivery position.

8. The structure of claim 6,
wherein the power means for raising said delivery trough into a retracted position comprises:
   a fluid pressure operated cylinder and piston transversely pivoted to said loading trough at one side thereof,
   a bell crank pivoted intermediate its ends for movement about an axis coaxial with the axis of pivotal connection of said delivery trough to said loading trough and having one downwardly extending lever arm pivotally connected to said delivery trough adjacent the lower end thereof,
   and another downwardly and rearwardly extending lever arm pivotally connected to said fluid pressure cylinder and piston,
whereby extensible movement of said cylinder and piston effects upward retractable movement of said delivery trough.

9. The structure of claim 8,
wherein means are provided engaged by said stop plate extending about the receiving end of said delivery trough for effecting the energization of said motor and preventing the energization of said motor except when said delivery trough is in a lowermost charging position which comprises a switch casing abutting the rear side of said stop plate extending about the discharge end of said loading trough, and extending rearwardly therefrom,
   wherein the switch casing contains a pair of normally open contacts connected to the energizing circuit to said motor and a movable contact closing a circuit to said normally opening contacts,
   and wherein a plunger extends from said movable contact through said stop plate extending about said loading trough into position to be engaged by said stop plate extending about the receiving end portion of said delivery trough, and depressed by said last mentioned stop plate to close a circuit between said two contacts and effect the energization of said electric motor when said delivery trough is in an extended delivery position.

References Cited
UNITED STATES PATENTS

| | | | |
|---|---|---|---|
| 2,962,174 | 11/1960 | Shekels | 214—18 |
| 3,085,675 | 4/1963 | Feiteira | 198—113 |
| 3,095,097 | 6/1963 | Mellow | 214—17 XR |
| 3,279,628 | 10/1966 | Brouwer et al. | 214—26 |

ROBERT G. SHERIDAN, *Primary Examiner.*

U.S. Cl. X.R.
198—113, 220